United States Patent Office.

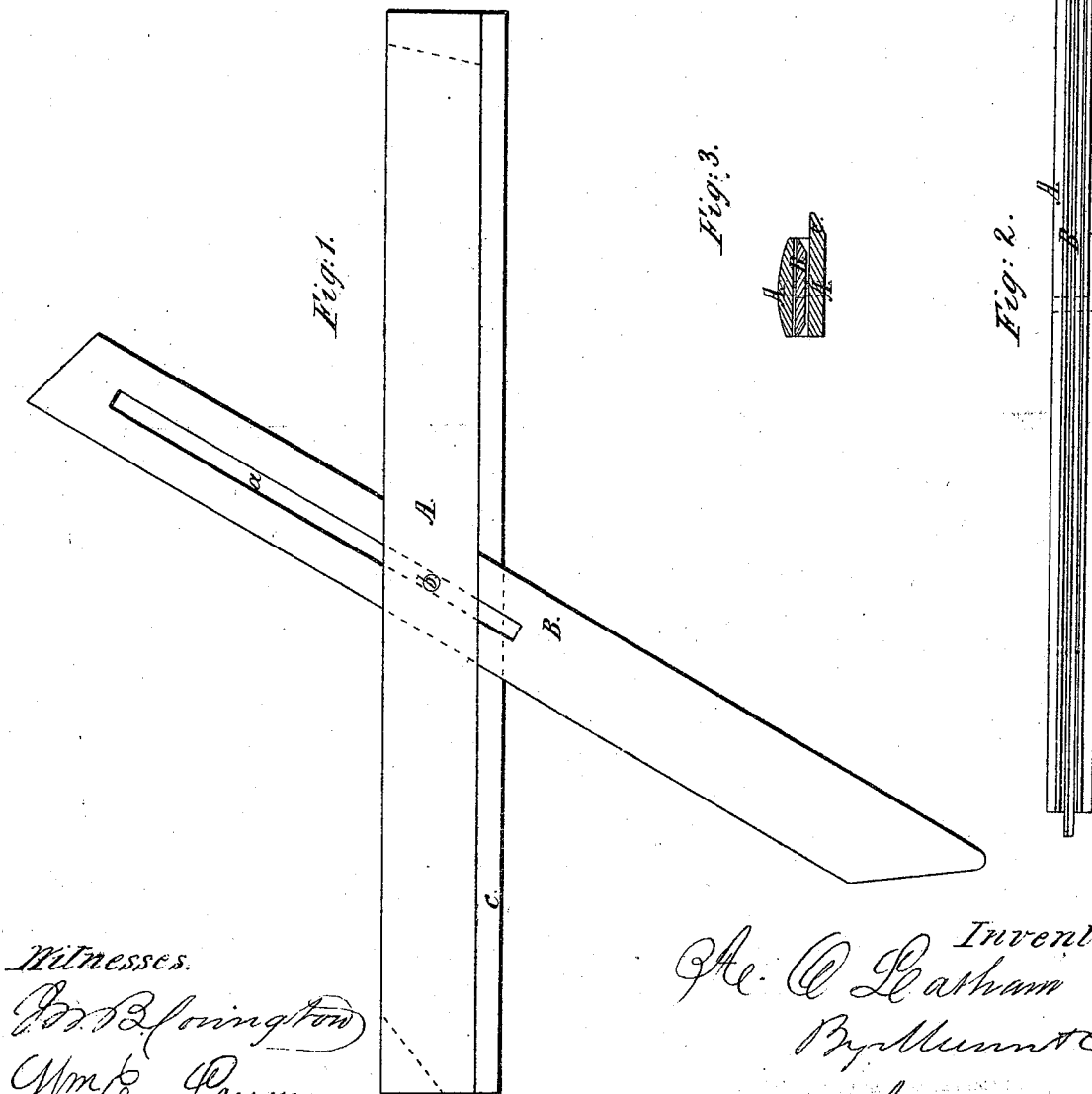

A. O. LATHAM, OF WHEELING, WEST VIRGINIA.

Letters Patent No. 63,060, dated March 19, 1867.

BOOK-KEEPER'S RULER.

*The Schedule referred to in these Letters Patent and making part of the same.*

TO ALL WHOM IT MAY CONCERN:

Be it known that I, A. O. LATHAM, of Wheeling, in the county of Ohio, and the State of West Virginia, have invented a new and improved Book-Keeper's Ruler; and I do hereby declare that the following is a full, clear, and exact description thereof, which will enable others skilled in the art to make and use the same, reference being had to the accompanying drawing, forming part of this specification, in which—

Figure 1 is a plan or top view of the ruler, with the secondary ruler thrown out.

Figure 2 is an edge view of the same, with the secondary ruler closed.

Figure 3 is a cross-section taken in the line x x, fig. 2.

Similar letters of reference indicate like parts.

This ruler is intended chiefly for book-keepers' use, and it consists in the combination of two rulers, one being the principal ruler for ruling lines parallel with the faint lines of the paper, and the other being a secondary ruler, closing within the other, and capable of adjustment at any desired angle for ruling angular lines across blank spaces when closing accounts, &c.

To enable others to understand my invention, I will proceed to describe it.

A represents the main ruler and B the secondary ruler. The main ruler has a slot cut longitudinally through it for nearly its entire length, to permit of the secondary ruler being closed or pushed therein, as shown in fig. 2; and through this secondary ruler a slot, a, is cut, longitudinally with its length, to permit its sliding upon or being guided by a pin, b, running through the main ruler A, as shown clearly in fig. 1. Hence it can be seen that the secondary ruler can be thrown out at any angle desired, and that its length below the main ruler can be regulated as desired. The main ruler A has a flange, c, made upon one of its sides to permit of ruling with a pen, so as not to get ink upon the paper.

This ruler, as before stated, will be found very useful to book-keepers and draughtsmen. It obviates the necessity of changing or moving the common ruler around for ruling angular lines, such as are necessary in order to fill blank spaces on a page, in order to place the footing at the bottom thereof. The secondary ruler, by reason of its adjustability, is enabled to be so placed as to draw angular lines without moving the main ruler, and also dispenses with the liability of the common ruler coming in contact with and blotting the closing lines when the ruler is changed from a horizontal to an angular position for ruling across blank space on the pages, which is very annoying to book-keepers. It also obviates the necessity of using the blotting-paper after ruling the closing lines, before changing the ruler to make the angular lines, which consumes much of the book-keeper's time, and is quite inconvenient when posting books.

What I claim as new, and desire to secure by Letters Patent, is—

The combination of the secondary ruler B with the main ruler A, the former swivelling upon a pin at or near the centre of the latter, substantially as and for the purpose specified.

A. O. LATHAM.

Witnesses:
THOS. H. LOGAN,
M. Y. WAYMAN.